United States Patent [19]

Zabar

[11] 4,335,424
[45] Jun. 15, 1982

[54] CYCLING FIRING METHOD FOR BYPASS OPERATION OF BRIDGE CONVERTERS

[76] Inventor: Zivan Zabar, 99-72 66th Rd., Apt. 9N, Forest Hills, N.Y. 11375

[21] Appl. No.: 181,067

[22] Filed: Aug. 25, 1980

[51] Int. Cl.³ .................................... H02H 7/125
[52] U.S. Cl. ............................................. 363/54
[58] Field of Search .................. 363/52, 53, 54, 67, 363/68

[56] References Cited

U.S. PATENT DOCUMENTS

| | | |
|---|---|---|
| 3,461,378 | 8/1969 | King . |
| 3,622,862 | 11/1971 | Boksjo . |
| 3,725,742 | 4/1973 | Pollard . |
| 3,842,335 | 10/1974 | Boksjo . |
| 3,886,432 | 5/1975 | Piccone et al. . |
| 3,921,038 | 11/1975 | Kernick et al. . |
| 3,943,427 | 3/1976 | Tolstov et al. . |
| 4,020,411 | 4/1977 | Tsuboi et al. ........................ 363/68 |
| 4,051,545 | 9/1977 | Kloss . |
| 4,084,406 | 4/1978 | Brenneman . |
| 4,181,932 | 1/1980 | Fujiwara .............................. 363/68 |

Primary Examiner—William M. Shoop

[57] ABSTRACT

The bridge converter comprises a number of switching elements and an electronic logic system which regulated the electric power levels by controlling the firing, i.e., the initiation of the conduction period of the switching elements.

Cyclic firing of said elements allows the direct current to bypass the alternating current system with high power factor and negligible losses.

1 Claim, 3 Drawing Figures

CYCLING FIRING METHOD FOR BYPASS OPERATION OF BRIDGE CONVERTERS

BACKGROUND OF THE INVENTION

The government has rights in this invention pursuing to contract number EY-76-02-3073 awarded by Department of Energy.

SUMMARY OF THE INVENTION

A high power static converter between direct and alternating electrical currents comprise series connected bridges consisting of a number of switching elements, such as vacuum tubes, thyratrons mercury vapor valves, ignitrons, thyristors, triacs, and transistors. Regulation of the power level is achieved by varying the firing delay angle of the individual bridges in accordance with system demands. To achieve high efficiency and low harmonic content, the power factor, i.e., the ratio of effective power to volt-ampere product on the a-c side should be as high as possible. Regulation of the power level with high efficiency and power factor is usually accomplished either by employing forced commutation, or by providing additional switching elements which bypass one or more bridges. In these cases the losses and costs are increased, while the reliability of the system is reduced.

The invention relates to a method by which the switching elements of one or more bridges are utilized to bypass the ac system directly. For this purpose the switching elements connected to one phase are made to conduct the direct current simultaneously, while those connected to the other phases are maintained in the nonconducting state. As a result, the dc circuit is closed through the small forward resistance of the switching elements while the ac system is open-circuited. Conduction among the switching elements is rotated cyclically among the phases in order to avoid thermal overheating, since the elements are rated at an average current of one third the nominal dc current.

Accordingly the primary object of the invention is to provide means to reduce the power level, i.e., the dc voltage level, of a bridge converter without reducing the power factor.

Another object of the invention is to avoid the need for bypass valves having much higher ratings than those of the bridge.

A further object of the invention is to operate a converter in the bypass mode without the need for additional switching elements in an external bypass.

Still a further object of the invention is to provide an individual bypass for each phase, thus preventing overheating of the other elements, when one phase is disconnected, e.g., by a blown fuse.

The cyclic firing scheme applies to converters comprising a parallel, as well as a series arrangement of bridges.

The cycling firing scheme applies to both the inverter and rectifier mode of operation of the converter.

BRIEF DESCRIPTION OF THE DRAWINGS

The aforementioned objects and advantages of the invention will be appreciated from the following description and accompanying drawing wherein.

DESCRIPTION OF THE PREFERRED EMBODIMENT

Figure 1:
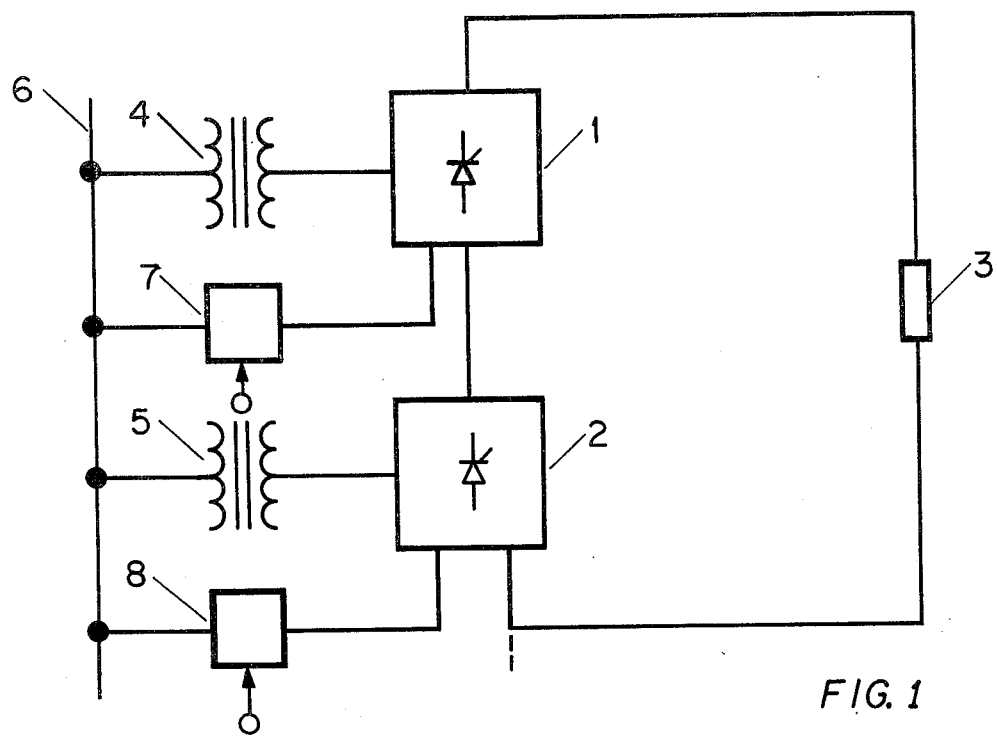
FIG. 1 illustrates the particular case of two series connected bridges.

Referring now in greater detail to the drawing, FIG. 1 shows two bridges, 1 and 2, connected in series. In practice, many bridges are usually connected in series to provide higher dc voltage. The transformers, 4 and 5, are used for voltage matching with the ac source 6, and for electrical insulation purposes. The firing logic circuits, 7 and 8, supply the triggering pulses required for normal operation and for the cyclic firing bypass mode in response to input signals. The firing logic circuits, 7 and 8, are synchronized to the voltage of the ac source 6. Reduction of the dc voltage across the load 3 by one half, for example, is done by applying the new cyclic firing method to bridge 1. The direct current in the load 3 bypasses the ac system of this bridge, while bridge 2 operates at maximum dc voltage, that means that the ac source 6 operates at the highest possible power factor.

Figure 2:
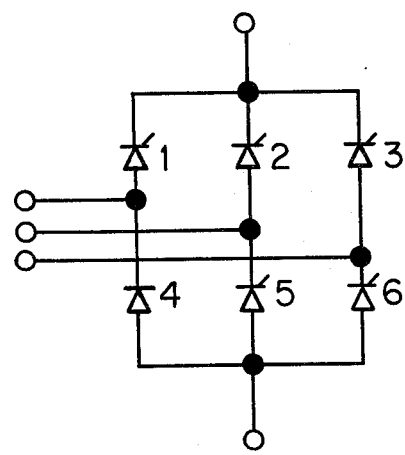
FIG. 2 gives the schematic diagram of one bridge (for this example, a three phase thyristorized bridge).
Figure 3:
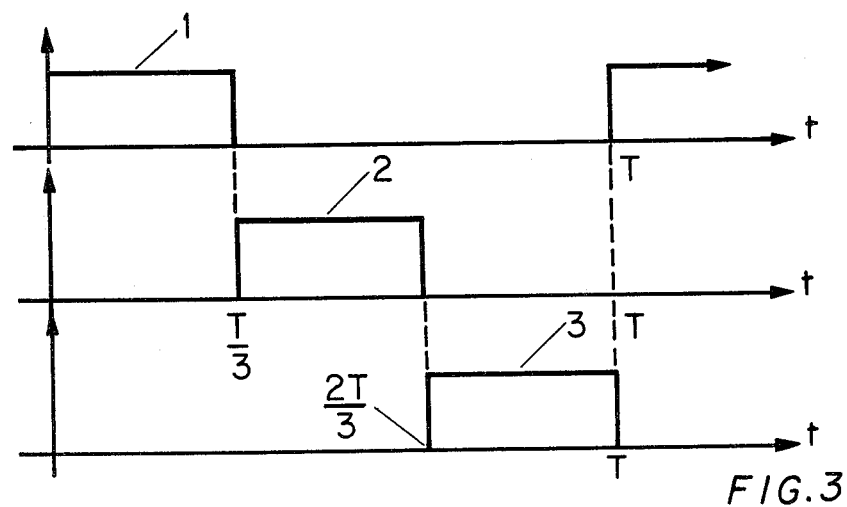
FIG. 3 shows the gating pulses to the bridge elements in a cyclic mode of operation.

FIG. 2 illustrates the example of a 3 phase thyristor bridge. FIG. 3 shows the gating pulses in the cyclic order. The cyclic firing method is performed in the following manner:

Step 1: Thyristors 1 and 4 in FIG. 2 receive the gating pulse 1 (FIG. 3) simultaneously for one third of the ac source cycle. All the other thyristors are fire-suppressed. The dc current (load current) flows through elements 1 and 4 and not through the ac source which practically sees an open circuit.

Step 2: After one-third of a cycle, thyristors 2 and 5 receive gating pulse 2, and the dc current flows through them and not in the ac source.

Step 3: After two-thirds of a cycle, thyristors 3 and 6 receive gating pulse 3, and the dc current flows through them.

The commutation process, which is the transfer of current from one element to the other, is achieved with the aid of the ac voltage source.

The delay in the firing angle is governed by trade-off consideration between the desire of having the dc voltage as low as possible and the reliability of the commutation process.

Realizing the bypass mode by using the main bridge components, instead of employing an external bypass valve, results in saving in capital investment. The penalty is the addition of reactive volt-ampers (VAr) absorbed from the ac system during the commutation process. These VAr's are proportional to the number of commutation processes and therefore it is necessary to reduce this number as much as possible.

A reduction in the reactive volt-ampers absorbed during the commutation process can be obtained by employing a cyclic firing frequency which is a submultiple of the ac supply frequency, for instance, one fourth.

I claim:

1. A cyclic firing method for bypass operation of bridge converter, whereby a pair of the switching elements of the bridge itself, connected to the same phase, is fired simultaneously at a submultiple of the ac supply frequency, is performed in the following sequence:
   a. gating pulses are transmitted to the elements in the first phase while all the others are fire-suppressed,
   b. gating pulses are transmitted to the elements in the second phase while all the others are fire-suppressed, and so on, depending on the number of phases and then back in a cyclic order.

* * * * *